US010030576B2

(12) United States Patent
Ueda et al.

(10) Patent No.: US 10,030,576 B2
(45) Date of Patent: Jul. 24, 2018

(54) VARIABLE GEOMETRY SYSTEM TURBOCHARGER (71) Applicant: IHI Corporation, Koto-ku (JP)

(72) Inventors: Takafumi Ueda, Tokyo (JP); Akira Iwakami, Tokyo (JP); Yoshinari Yoshida, Tokyo (JP); Naoki Tokue, Tokyo (JP); Masaru Nishioka, Tokyo (JP); Mikito Ishii, Tokyo (JP)

(73) Assignee: IHI Corporation, Koto-ku (JP)

( * ) Notice: Subject to any disclaimer, the term of this patent is extended or adjusted under 35 U.S.C. 154(b) by 861 days.

(21) Appl. No.: 14/598,254

(22) Filed: Jan. 16, 2015

(65) Prior Publication Data

US 2015/0125275 A1 May 7, 2015

Related U.S. Application Data (63) Continuation of application No. PCT/JP2013/073279, filed on Aug. 30, 2013.

(30) Foreign Application Priority Data

Sep. 10, 2012 (JP) ................................. 2012-198085

(51) Int. Cl.
*F01D 17/16* (2006.01)
*F02B 37/22* (2006.01)
(Continued)

(52) U.S. Cl.
CPC ............ *F02B 37/22* (2013.01); *F01D 17/165* (2013.01); *F01D 25/246* (2013.01); *F02B 37/24* (2013.01);
(Continued)

(58) Field of Classification Search
CPC ........ F02B 37/22; F02B 37/24; F01D 25/246; F01D 17/165; F05D 2260/31; F05D 2220/40; Y02T 10/144
See application file for complete search history.

(56) References Cited

U.S. PATENT DOCUMENTS 7,322,791 B2 * 1/2008 Stilgenbauer ......... F01D 17/165
 415/160
8,485,779 B2 * 7/2013 Matsuyama .......... F01D 17/165
 415/164

(Continued)

FOREIGN PATENT DOCUMENTS

CN    101896704 A    11/2010
CN    101946069 A    1/2011
(Continued)

OTHER PUBLICATIONS

International Search Report dated Nov. 19, 2013 for PCT/JP2013/073279 filed on Aug. 30, 2013 with English Translation.

(Continued)

*Primary Examiner* — Eldon Brockman
(74) *Attorney, Agent, or Firm* — Oblon, McClelland, Maier & Neustadt, L.L.P.

(57) ABSTRACT

A bottom surface of a housing recess of a turbine housing includes a close attachment portion in a continuous annular land shape, which is located radially outside a fitting recess. The close attachment portion is closely attached to a portion radially outside first support holes in a surface of a shroud ring opposite from its facing surface, by a fastening force of attachment bolts. The first support holes in the shroud ring communicate with an outlet side of a turbine impeller through a connection path and a cutout.

6 Claims, 8 Drawing Sheets

(51) Int. Cl.
*F02B 37/24* (2006.01)
*F01D 25/24* (2006.01)
(52) U.S. Cl.
CPC ...... *F05D 2220/40* (2013.01); *F05D 2260/31* (2013.01); *Y02T 10/144* (2013.01)

(56) References Cited

U.S. PATENT DOCUMENTS

| | | | |
|---|---|---|---|
| 9,074,687 B2* | 7/2015 | Matsuyama | F02B 37/00 |
| 9,121,300 B2* | 9/2015 | Matsuyama | F01D 17/165 |
| 9,618,005 B2* | 4/2017 | Segawa | F01D 11/005 |
| 2010/0247296 A1* | 9/2010 | Matsuyama | F01D 17/165 415/170.1 |
| 2010/0310365 A1 | 12/2010 | Matsuyama et al. | |
| 2014/0334918 A1 | 11/2014 | Ueda et al. | |
| 2015/0056067 A1* | 2/2015 | Segawa | F01D 11/005 415/167 |

FOREIGN PATENT DOCUMENTS

| | | |
|---|---|---|
| JP | 2006-125588 A1 | 5/2006 |
| JP | 2006-177318 A1 | 7/2006 |
| JP | 2009-074492 A1 | 4/2009 |
| JP | 2009-144545 A1 | 7/2009 |
| JP | 2010-001863 A1 | 1/2010 |
| JP | 2010-90713 A | 4/2010 |
| JP | 2010-112195 A1 | 5/2010 |
| JP | 2010-190092 A1 | 9/2010 |

OTHER PUBLICATIONS

Written Opinion dated Nov. 19, 2013 for PCT/JP2013/073279 filed on Aug. 30, 2013.
Combined Office Action and Search Report dated Jun. 24, 2016 in Chinese Patent Application No. 201380038304.0 (with English translation of Categories of Cited Documents).

* cited by examiner

VARIABLE GEOMETRY SYSTEM TURBOCHARGER

CROSS REFERENCE TO RELATED APPLICATIONS

This application is a continuation application of International Application No. PCT/JP2013/073279, filed on Aug. 30, 2013, which claims priority to Japanese Patent Application No. 2012-198085, filed on Sep. 10, 2012, the entire contents of which are incorporated by references herein.

BACKGROUND OF THE INVENTION

1. Field of the Invention

The present invention relates to a variable geometry system turbocharger equipped with a variable nozzle unit which can alter a passage area for (a flow rate of) an exhaust gas to be supplied to a turbine impeller side.

2. Description of the Related Art

In recent years, various developments have been made on a variable nozzle unit, which is disposed between a turbine scroll passage and a gas discharge port inside a turbine housing of a variable geometry system turbocharger in such a way as to surround a turbine impeller (see Japanese Patent Application Laid-Open Publication No. 2009-144545). A specific configuration of a conventional variable nozzle unit is as described below.

Inside a turbine housing, there is provided a shroud ring which covers outer edges of multiple turbine blades of a turbine impeller. Multiple first support holes are formed to penetrate the shroud ring at regular intervals in its circumferential direction. Moreover, a nozzle ring is provided at a position away from and opposed to the shroud ring in the axial direction of the turbine impeller, and is united to the shroud ring. The nozzle ring is provided with multiple second support holes formed to penetrate the nozzle ring at regular intervals in its circumferential direction in such a way as to match the multiple first support holes in the shroud ring.

Multiple variable nozzles are disposed circumferentially at regular intervals between a facing surface of the shroud ring and a facing surface of the nozzle ring. Each variable nozzle is rotatable in forward and reverse directions (opening and closing directions) about its shaft center which is parallel to the shaft center of the turbine impeller. Moreover, a first nozzle shaft is formed integrally with a side surface of each variable nozzle on one side in the axial direction. The first nozzle shaft of each variable nozzle is rotatably supported by the corresponding first support hole in the shroud ring. Furthermore, a second nozzle shaft is formed integrally with a side surface of each variable nozzle on the other side in the axial direction, and coaxially with its corresponding first nozzle shaft. The second nozzle shaft of each variable nozzle is rotatably supported by its corresponding second support hole in the nozzle ring. Here, when the multiple variable nozzles are synchronously rotated in the forward direction (the opening direction), a passage area for an exhaust gas to be supplied to the turbine impeller side increases. When the multiple variable nozzles are synchronously rotated in the reverse direction (the closing direction), the passage area for the exhaust gas decreases.

A surface side of the nozzle ring opposite from the aforementioned facing surface communicates with a turbine scroll passage. An annular seal cover is provided between an outer edge portion of the shroud ring and an inner wall surface of the turbine housing. The seal cover establishes airtight sealing (blocking) between a surface side of the shroud ring opposite from the aforementioned facing surface (an end surface side of the first nozzle shaft of each variable nozzle) and the turbine scroll passage. The surface side of the shroud ring opposite from its facing surface communicates with an outlet side of the turbine impeller.

In the state where the surface side of the nozzle ring opposite from its facing surface communicates with the turbine scroll passage, and where the airtight sealing (blocking) is established between the surface side of the shroud ring opposite from its facing surface and the turbine scroll passage by using the seal cover, the surface side of the shroud ring opposite from its facing surface communicates with the outlet side of the turbine impeller. Accordingly, while the variable geometry system turbocharger is in operation, a pressure acting on the end surface of the first nozzle shaft of each variable nozzle can be made substantially smaller than a pressure acting on an end surface of the second nozzle shaft thereof. Thus, each variable nozzle can be brought closer to the facing surface side of the shroud ring by way of the difference in pressure, so that a side clearance between the side surface of each variable nozzle on the one side in the axial direction and the facing surface of the shroud ring can be made as small as possible. As a consequence, it is possible to suppress a leakage flow from a gap between the side surface of each variable nozzle on the one side in the axial direction and the facing surface of the shroud ring, to stabilize a flow of the exhaust gas along a tip side portion (a portion from a mid-span side to a tip side) of each turbine blade, and to sufficiently enhance turbine efficiency of the variable geometry system turbocharger.

SUMMARY OF THE INVENTION

In the meantime, while the variable nozzle unit according to the related art can sufficiently enhance the turbine efficiency of the variable geometry system turbocharger by bringing each variable nozzle closer to the facing surface side of the shroud ring as described above, the annular seal cover that establishes the airtight sealing between the surface side of the shroud ring opposite from its facing surface and the turbine scroll passage becomes an indispensable constituent for the variable nozzle unit, or in other words, an indispensable constituent for the variable geometry system turbocharger. For this reason, the number of components of the variable geometry system turbocharger increases, so that the configuration of the variable geometry system turbocharger is complicated, whereby ease of assembly of the variable geometry system turbocharger deteriorates. That is to say, it is difficult to sufficiently enhance the turbine efficiency of the variable geometry system turbocharger while achieving simplification of the configuration of the variable geometry system turbocharger and an improvement in ease of assembly thereof.

In view of the above, it is an object of the present invention to provide a variable geometry system turbocharger, which is capable of sufficiently enhancing turbine efficiency of the variable geometry system turbocharger while achieving simplification of a configuration of the variable geometry system turbocharger and an improvement in ease of assembly thereof.

An aspect of the present invention is a variable geometry system turbocharger which is equipped with a variable nozzle unit disposed between a turbine scroll passage and a gas discharge port inside a turbine housing in such a way as to surround a turbine impeller, and which is capable of altering a passage area for (a flow rate of) an exhaust gas to be supplied to the turbine impeller side. Its gist is as follows. The variable nozzle unit includes: a shroud ring being provided to in a manner united to an inner wall surface of the turbine housing (the inner wall surface between the turbine scroll passage and the gas discharge port inside the turbine housing) by using an attachment bolt (a fastening bolt), including multiple first support holes formed to penetrate the shroud ring and arranged in its circumferential direction, and covering outer edges of multiple turbine blades of the turbine impeller; a nozzle ring being provided at a position away from the shroud ring in an axial direction of the turbine impeller in a manner united to the shroud ring, and including multiple second support holes formed to penetrate the nozzle ring and arranged in its circumferential direction in such a way as to match the multiple first support holes in the shroud ring; and multiple variable nozzles being disposed in the circumferential direction of the rings between a facing surface of the shroud ring and a facing surface of the nozzle ring, each variable nozzle being rotatable in forward and reverse directions (opening and closing direction) about a shaft center which is parallel to a shaft center of the turbine impeller, each variable nozzle including a first nozzle shaft formed integrally with a side surface of the variable nozzle on one side of in the axial direction, the first nozzle shaft rotatably supported by the corresponding first support hole in the shroud ring, each variable nozzle including a second nozzle shaft formed integrally with a side surface of the variable nozzle on another side in the axial direction, the second nozzle shaft being coaxially with the first nozzle shaft, and the second nozzle shaft rotatably supported by (penetrating and supported by) the corresponding second support hole in the nozzle ring. A surface side of the nozzle ring opposite from its facing surface communicates with the turbine scroll passage. The inner wall surface of the turbine housing includes a close attachment portion in a continuous annular shape to be closely attached to a portion radially outside the first support holes in a surface of the shroud ring opposite from its facing surface by a fastening force of the attachment bolt. The multiple first support holes in the shroud ring communicate with an outlet side of the turbine impeller.

In the description and claims of this application, the meaning of the term "disposed" includes: being disposed directly; and being disposed indirectly through another member. Meanwhile, the meaning of the term "provided" includes: being provided directly; and being provided indirectly through another member.

According to the present invention, it is possible to provide a variable geometry system turbocharger, which is capable of sufficiently enhancing turbine efficiency of the variable geometry system turbocharger while achieving simplification of a configuration of the variable geometry system turbocharger and an improvement in ease of assembly thereof.

DESCRIPTION OF THE PREFERRED EMBODIMENTS

First Embodiment

A first embodiment of the present invention will be described with reference to FIG. 1 to FIG. 6. Here, as shown in the drawings, "R" means a right-hand direction while "L" means a left-hand direction.

Figure 3:
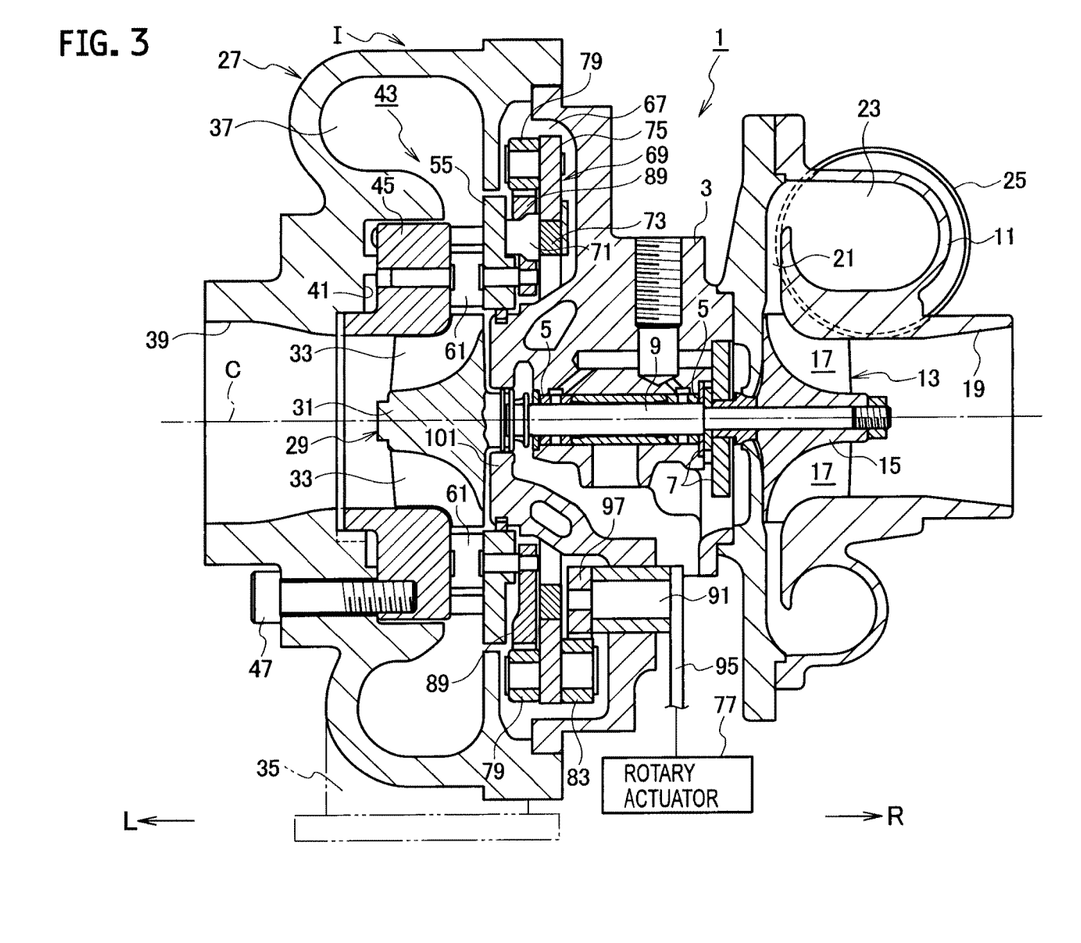
FIG. 3 is a front sectional view of a variable geometry system turbocharger according to a first embodiment of the present invention.

As shown in FIG. 3, a variable geometry system turbocharger 1 according to the first embodiment of the present invention supercharges (compresses) air to be supplied to an engine (not shown) by using energy of an exhaust gas from the engine.

The variable geometry system turbocharger 1 includes a bearing housing 3. A radial bearing 5 and a pair of thrust bearings 7 are provided inside the bearing housing 3. In addition, a rotor shaft (a turbine shaft) 9 extending in a right-left direction is rotatably provided to the multiple bearings 5 and 7. In other words, the rotor shaft 9 is rotatably provided to the bearing housing 3 through the multiple bearings 5 and 7.

A compressor housing 11 is provided on the right side of the bearing housing 3. A compressor impeller 13 configured to compress the air by using a centrifugal force is provided inside the compressor housing 11 in such a way as to be rotatable about its shaft center (in other words, the shaft center of the rotor shaft 9) C. In the meantime, the compressor impeller 13 includes a compressor wheel (a compressor disc) 15 connected and united to a right end portion of the rotor shaft 9, and several compressor blades 17 provided on an outer peripheral surface of the compressor wheel 15 at regular intervals in its circumferential direction.

An air introduction port 19 for introducing the air is formed on an inlet side of the compressor impeller 13 in the compressor housing 11 (at a right side portion of the compressor housing 11). The air introduction port 19 is connectable to an air cleaner (not shown) configured to clean up the air. Meanwhile, an annular diffuser passage 21 configured to boost the compressed air is formed on an outlet side of the compressor impeller 13 between the bearing housing 3 and the compressor housing 11. In addition, a compressor scroll passage 23 in a scroll shape is formed inside the compressor housing 11. The compressor scroll passage 23 communicates with the diffuser passage 21. Moreover, an air discharge port 25 configured to discharge the compressed air is formed at an appropriate position of the compressor housing 11. The air discharge port 25 communicates with the compressor scroll passage 23 and is connectable to an intake manifold (not shown) of the engine.

Figure 1:
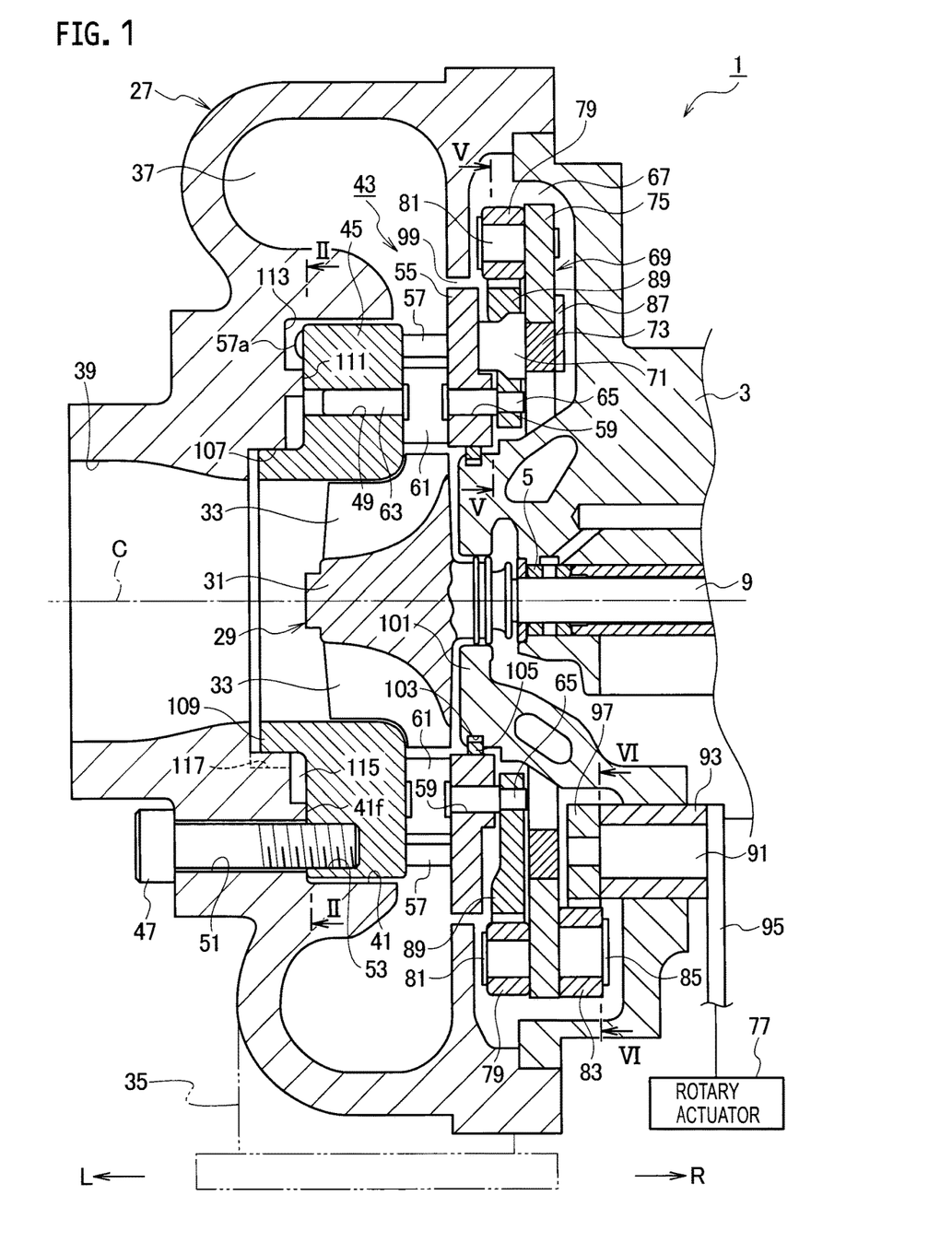
FIG. 1 is an enlarged view of a portion indicated with an arrow I in FIG. 3.

As shown in FIG. 1 and FIG. 3, a turbine housing 27 is provided on the left side of the bearing housing 3. Inside the turbine housing 27, a turbine impeller 29 configured to generate a rotational force (rotational torque) by using the pressure energy of the exhaust gas is provided rotatably about the shaft center (the shaft center of the turbine impeller 29, or in other words, the shaft center of the rotor shaft 9) C.

In the meantime, the turbine impeller 29 includes a turbine wheel (a turbine disc) 31 integrally provided at a left end portion of the rotor shaft 9, and multiple turbine blades 33 provided on an outer peripheral surface of the turbine wheel 31 at regular intervals in its circumferential direction.

A gas introduction port 35 for introducing the exhaust gas is formed at an appropriate position of the turbine housing 27. The gas introduction port 35 is connectable to an exhaust manifold (not shown) of the engine. In addition, a turbine scroll passage 37 in a scroll shape is formed inside the turbine housing 27. The turbine scroll passage 37 communicates with the gas introduction port 35. Moreover, a gas discharge port 39 configured to discharge the exhaust gas is formed on an outlet side of the turbine impeller 29 in the turbine housing 27 (at a left side portion of the turbine housing 27). The gas discharge port 39 is connectable to an exhaust emission control system (not shown) configured to clean up the exhaust gas.

Furthermore, an annular housing recess 41 is formed between the turbine scroll passage 37 and the gas discharge port 39 inside the turbine housing 27.

A variable nozzle unit 43, which can alter a passage area for (a flow rate of) the exhaust gas to be supplied to the turbine impeller 29 side, is disposed between the turbine scroll passage 37 and the gas discharge port 39 inside the turbine housing in such a way as to surround the turbine impeller.

Figure 2:
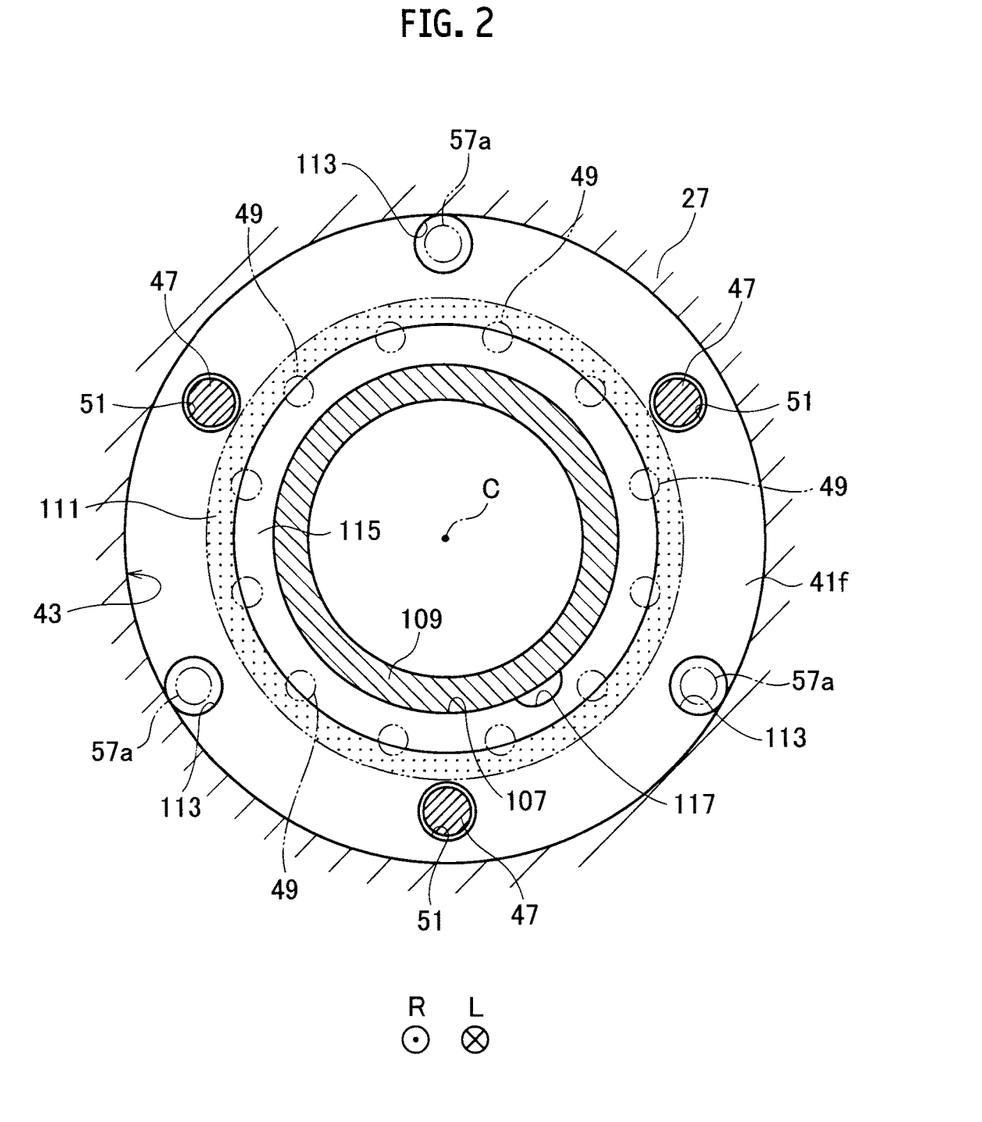
FIG. 2 is a view of the portion taken along the II-II line in FIG. 1.

A detailed configuration of the variable nozzle unit 43 is as described below. As shown in FIG. 1 to FIG. 3, a shroud ring 45 is provided in a manner united to a bottom surface (one of inner wall surfaces of the turbine housing 27) 41f of the housing recess 41 inside the turbine housing 27 by using multiple attachment bolts (fastening bolts) 47. The shroud ring 45 is located concentrically with the turbine impeller 29, and covers outer edges (tip edges) of the multiple turbine blades 33. In addition, the shroud ring 45 includes multiple first support holes 49 formed in its circumferential direction to penetrate the shroud ring 45. Here, the attachment bolts 47 are inserted through insertion holes 51 formed to penetrate the turbine housing 27, and are threadedly engaged with screw holes 53 formed in the shroud ring 45.

A nozzle ring 55 is provided at a position away from and opposed to the shroud ring 45 in the right-left direction (the axial direction of the turbine impeller 29). The nozzle ring 55 is united in a concentric manner to the shroud ring 45 through multiple connection pins 57. The nozzle ring 55 includes multiple second support holes 59 formed to penetrate the nozzle ring 55 and arranged in its circumferential direction in such a way as to match the multiple first support holes 49 in the shroud ring 45. Here, the multiple connection pins 57 define a clearance between a facing surface of the shroud ring 45 and a facing surface of the nozzle ring 55.

Multiple variable nozzles 61 are disposed circumferentially between the facing surface of the shroud ring 45 and the facing surface of the nozzle ring 55. Each variable nozzle 61 is rotatable in forward and reverse directions (opening and closing directions) about its shaft center which is parallel to the shaft center C of the turbine impeller 29. Moreover, a first nozzle shaft 63 is formed integrally with a left side surface of each variable nozzle 61 (a side surface on one side in the axial direction of the turbine impeller 29). The first nozzle shaft 63 of each variable nozzle 61 is rotatably supported by the corresponding first support hole 49 in the shroud ring 45. Furthermore, a second nozzle shaft 65 is formed integrally with a right side surface of each variable nozzle 61 (a side surface on the other side in the axial direction of the turbine impeller 29), and concentrically with the first nozzle shaft 63. The second nozzle shaft 65 of each variable nozzle 61 is rotatably supported by (supported by insertion through) the corresponding second support hole 59 in the nozzle ring 55. Here, an interval between each two adjacent variable nozzles 61 does not always have to be constant in consideration of shapes of the individual variable nozzles 61 and/or aerodynamic influences thereof. In such a case, intervals between the first support holes 49 and intervals between the second support holes 59 are set so as to match the intervals of the variable nozzles 61.

An annular link chamber 67 is formed on a surface side of the nozzle ring 55 opposite from its facing surface. A link mechanism 69 for rotating the multiple variable nozzles 61 synchronously in the forward and reverse directions (the opening and closing directions) is disposed inside the link chamber 67. The link mechanism 69 is connected to and interlocks with the second nozzle shafts 65 of the multiple variable nozzles 61.

Figure 4:
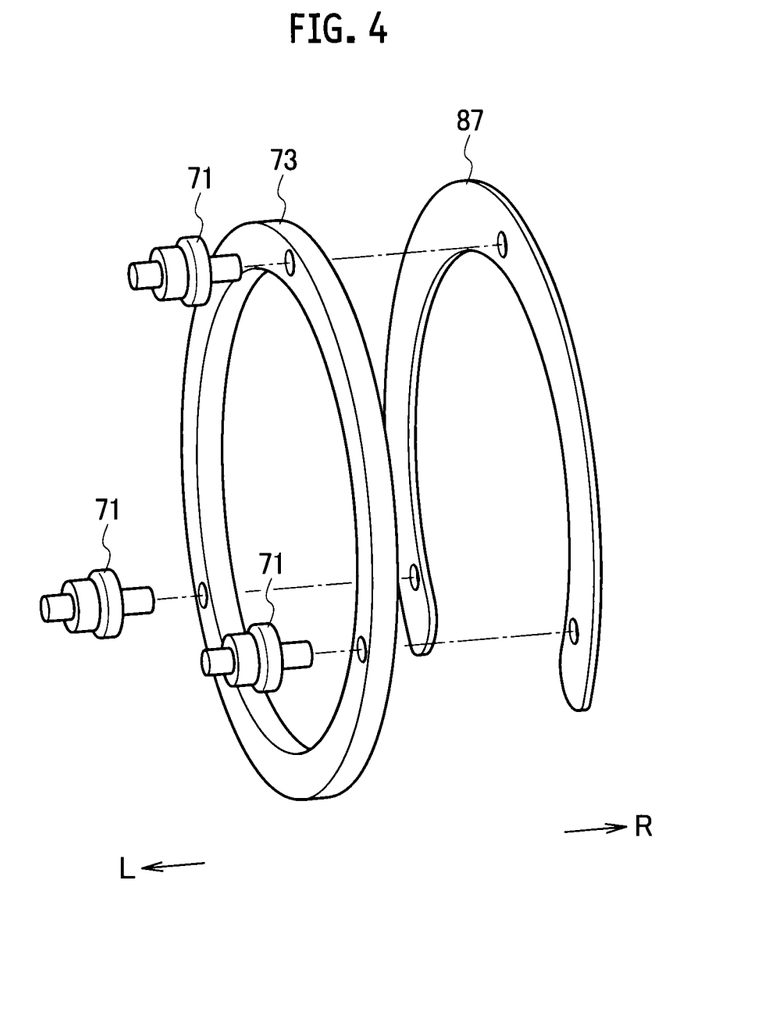
FIG. 4 is a perspective view showing relations among multiple attachment pins, a guide ring, and a stopper.

A specific configuration of the link mechanism 69 in the variable nozzle unit 43 is as described below. As shown in FIG. 1 and FIG. 4, three attachment pins 71 are disposed on the surface (the right side surface) of the nozzle ring 55 opposite from its facing surface at intervals in its circumferential direction. The attachment pins 71 are located radially outside the second support holes 59 in the nozzle ring 55. Meanwhile, a guide ring 73 is provided across right end surfaces (end surfaces on the other side in the axial direction of the turbine impeller 29) of the multiple attachment pins 71. The guide ring 73 is located concentrically with the nozzle ring 55. Here, there attachment pins 71 are provided in the embodiment. Instead, four or more attachment pins 71 may be provided therein.

Figure 5:
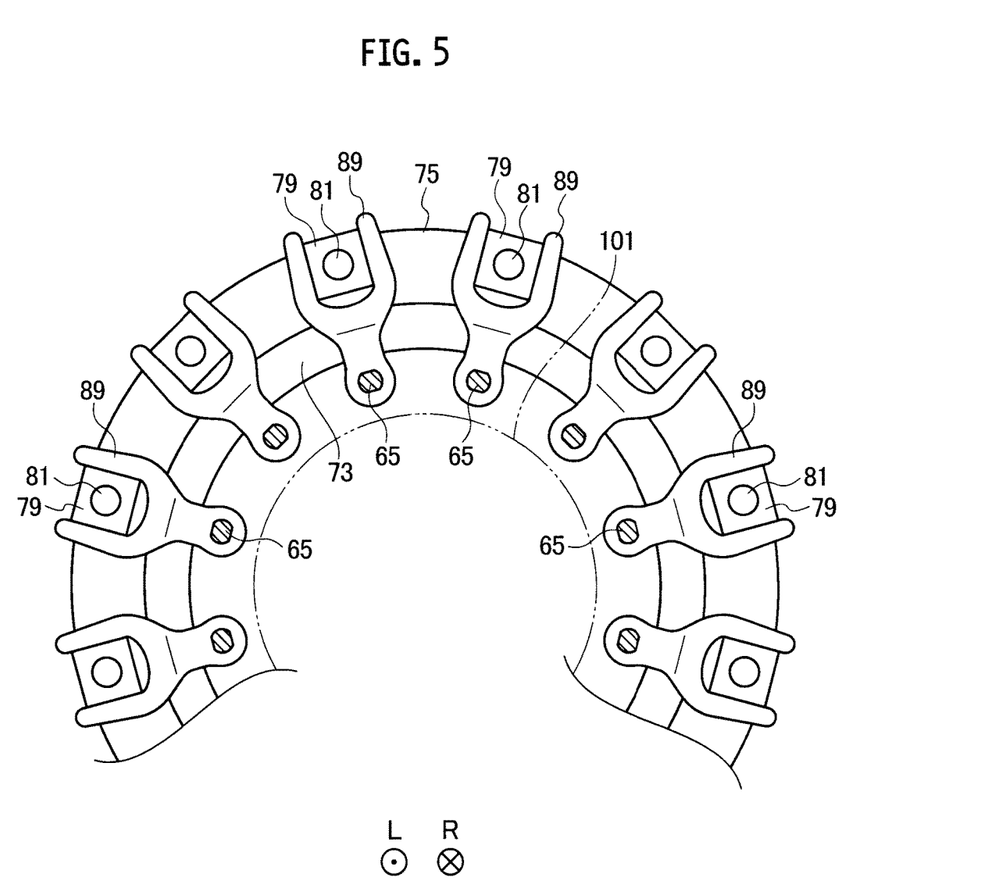
FIG. 5 is a view of the portion taken along the V-V line in FIG. 1.
Figure 6:
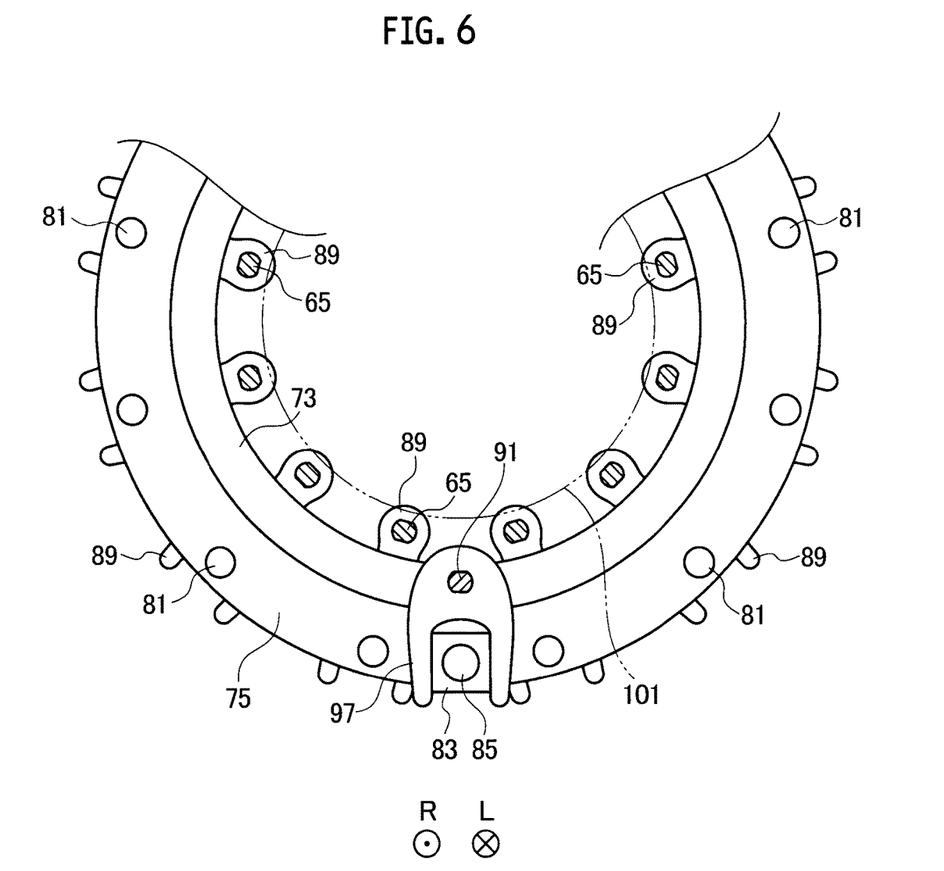
FIG. 6 is a view of the portion taken along the VI-VI line in FIG. 1.

As shown in FIG. 1, FIG. 5, and FIG. 6, a drive ring 75 is rotatably provided on an outer peripheral surface of the guide ring 73. The drive ring 75 is rotated in the forward and reverse directions by the drive of a rotary actuator 77 such as an electric motor and a negative pressure cylinder. In the meantime, as many rectangular engagement joints (engagement portions) 79 as the variable nozzles 61 are provided on a left side surface of the drive ring 75 in its circumferential direction through connection pins 81. A different rectangular engagement joint (a different engagement portion) 83 is provided on a right side surface of the drive ring 75 through a connection pin 85.

As shown in FIG. 1 and FIG. 4, a C-shaped stopper 87 configured to restrain movement of the drive ring 75 in the right-left directions in cooperation with the right end surfaces of the multiple attachment pins 71 is provided on a right side surface of the guide ring 73. Although the stopper 87 is in the C-shape, the stopper 87 may be in an annular shape instead.

As shown in FIG. 1, FIG. 5, and FIG. 6, a synchronization link 89 is provided in a manner united to a tip portion (a right end portion) of the second nozzle shaft 65 of each variable nozzle 61. A tip side portion of each synchronization link 89 is forked and engages in a nipping manner with the corresponding engagement joint 79 of the drive ring 75. Meanwhile, a drive shaft 91 is provided to a left side portion of the bearing housing 3 through a bush 93 in such a way as to be rotatable about the shaft center which is parallel to the shaft center of the turbine impeller 29. A right end portion of the drive shaft 91 is connected to the rotary actuator 77 through a power transmission mechanism 95. In addition, a drive link 97 is provided in a manner united to a left end portion of the drive shaft 91. A tip side portion of the drive link 97 is forked and engaged in a nipping manner with the different engagement joint 83 of the drive ring 75.

Next, principal part of the variable geometry system turbocharger 1, inclusive of characteristic portions of the variable nozzle unit 43, will be described.

As shown in FIG. 1, an annular connection gap 99 is formed between an outer peripheral surface of the nozzle ring 55 and an inner wall surface of the turbine housing 27 (an inner peripheral surface of a wall portion that separates the turbine scroll passage 37 and the link chamber 67 from each other). The surface side of the nozzle ring 55 opposite from its facing surface communicates with the turbine scroll passage 37 through the connection gap 99. Meanwhile, a housing protrusion 101 is formed on the left side of the bearing housing 3 in such a way as to protrude leftward. A tip side of the housing protrusion 101 is located inside the nozzle ring 55. A ring groove 103 is formed in an outer peripheral surface on the tip side of the housing protrusion 101. Moreover, a seal ring 105 is provided in pressure contact with an inner peripheral surface of the nozzle ring 55 by its own elastic force (the elastic force of the seal ring 105). An inner peripheral edge portion of the seal ring 105 is fitted into the ring groove 103 of the housing protrusion 101 of the bearing housing 3. Here, the seal ring 105 functions as a sealing unit configured to prevent the exhaust gas from leakage from the surface side (the link chamber 67 side) of the nozzle ring 55 opposite from its facing surface to an inlet side of the turbine impeller 29.

As shown in FIG. 1 and FIG. 2, on the center side (the side close to an inlet of the gas discharge port 39) of the bottom surface 41*f* of the housing recess 41 of the turbine housing 27, an annular fitting recess 107 is formed concentrically with the turbine impeller 29. An annular fitting projection 109 is formed on an inner peripheral edge side of the surface of the shroud ring 45 opposite from its facing surface. The annular fitting projection 109 is fitted to the fitting recess 107 of the turbine housing 27. The annular fitting projection 109 is formed to project to the gas discharge port 39 side (to the one side in the axial direction of the turbine impeller 29). Moreover, the bottom surface 41*f* of the housing recess 41 of the turbine housing 27 is provided with a close attachment portion 111 (a dot-hatched region in FIG. 2) located radially outside the fitting recess 107. The close attachment portion 111 is formed into a continuous annular land shape (a projecting shape), and is closely attached to a portion radially outside the first support holes 49 on the surface of the shroud ring 45 opposite from its facing surface, by a fastening force of the multiple attachment bolts 47. Furthermore, multiple dents 113 are formed in a region radially outside the close attachment portion 111 on the bottom surface 41*f* of the housing recess 41 of the turbine housing 27. The multiple dents 113 are formed at intervals in the circumferential direction, and each dent 113 houses a swaged head 57*a* formed at one end portion of the corresponding connection pin 57. Here, instead of forming the close attachment portion 111 of the turbine housing 27 into the land shape, a region on the surface of the shroud ring 45 opposite from its facing surface, which is closely attached to (in contact with) the close attachment portion 111 of the turbine housing 27, may have a land shape.

An annular connection path 115 is defined (formed) between a radially inner side (a radially inside portion) of the close attachment portion 111 on the bottom surface 41*f* of the housing recess 41 of the turbine housing 27 and the surface of the shroud ring 45 opposite from its facing surface. The connection path 115 communicates with the multiple first support holes 49 in the shroud ring 45. Meanwhile, a cutout 117 is formed at the fitting recess 107 of the turbine housing 27. The cutout 117 communicates with the connection path 115 and the outlet side of the turbine impeller 29. In other words, the multiple first support holes 49 in the shroud ring 45 communicate with the outlet side of the turbine impeller 29 through the connection path 115 and the cutout 117. Here, instead of forming the cutout 117 at the fitting recess 107 of the turbine housing 27, a different cutout (not shown) communicating with the connection path 115 and the outlet side of the turbine impeller 29 may be formed at the fitting projection 109 of the shroud ring 45. Alternatively, the connection path 115 and the above-mentioned cutout (not shown) may be formed in addition to the cutout 117.

Next, the operation and effect of the first embodiment of the present invention will be described.

The exhaust gas introduced from the gas introduction port 35 flows from the inlet side to the outlet side of the turbine impeller 29 via the turbine scroll passage 37. The rotational force (the rotational torque) is generated by using the pressure energy of the exhaust gas generated by the flow of the exhaust gas. Accordingly, the rotor shaft 9 and the compressor impeller 13 can be rotated integrally with the turbine impeller 29. Thus, it is possible to compress the air introduced from the air introduction port 19, to discharge the air from the air discharge port 25 via the diffuser passage 21 and the compressor scroll passage 23, and thereby to supercharge (compress) the air to be supplied to the engine.

When the number of revolutions of the engine is in a high-revolution range, the drive shaft 91 is rotated in one direction (clockwise in FIG. 6) by the drive of the rotary actuator 77. By this rotating action, the drive link 97 swings in the one direction and the drive ring 75 rotates in the forward direction (counterclockwise in FIG. 5 and clockwise in FIG. 6) in accordance therewith. This makes it possible to rotate the multiple variable nozzles 61 synchronously in the forward direction (the opening direction) while causing the multiple synchronization links 89 to swing in the forward direction, and thereby to increase the aperture of the multiple variable nozzles 61. Thus, a larger amount of the exhaust gas can be supplied to the turbine impeller 29 side by increasing the passage area for (the flow rate of) the exhaust gas to be supplied to the turbine impeller 29 side.

When the number of revolutions of the engine is in a low-revolution range, the drive shaft 91 is rotated in the other direction (counterclockwise in FIG. 6) by the drive of the rotary actuator 77. By this rotating action, the drive link 97 swings in the other direction and the drive ring 75 rotates in the reverse direction (clockwise in FIG. 5 and counterclockwise in FIG. 6) in accordance therewith. This makes it possible to rotate the multiple variable nozzles 61 synchronously in the reverse direction (the closing direction) while causing the multiple synchronization links 89 to swing in the reverse direction, and thereby to decrease the aperture of the multiple variable nozzles 61. Thus, a flow velocity of the exhaust gas can be increased by decreasing the passage area for the exhaust gas to be supplied to the turbine impeller 29 side, thereby ensuring a sufficient workload of the turbine impeller 29 (an ordinary operation of the variable geometry system turbocharger 1).

The bottom surface 41*f* of the housing recess 41 of the turbine housing 27 includes the annular close attachment portion 111. The close attachment portion 111 of the turbine housing 27 as well as the region on the surface of the shroud ring 45 opposite from its facing surface, which is the region to be closely attached to (in contact with) the close attachment portion 111 of the turbine housing 27, function as sealing surfaces. As a result, it is possible to establish airtight sealing (blocking) between the turbine scroll passage 37 and the radially inner side of the closely attached region on the surface of the shroud ring 45 opposite from its facing surface. In other words, it is possible to establish the airtight sealing between the turbine scroll passage 37 and the radially inner side of the closely attached region on the surface of the shroud ring 45 opposite from its facing surface without using a seal cover. Moreover, the surface side of the nozzle ring 55 opposite from its facing surface communicates with the turbine scroll passage 37, and the multiple first support holes 49 in the shroud ring 45 communicate with the outlet side of the turbine impeller 29. As a consequence, while the variable geometry system turbocharger 1 is in operation, a pressure acting on an end surface of the first nozzle shaft 63 of each variable nozzle 61 can be made substantially smaller than a pressure acting on an end surface of the corresponding second nozzle shaft 65. Thus, each variable nozzle 61 can be brought closer to the facing surface side of the shroud ring 45 by way of the difference in pressure without the use of a seal cover, so that a side clearance between the left side surface of each variable nozzle 61 and the facing surface of the shroud ring 45 can be made as small as possible.

In addition, on the center side of the bottom surface 41f of the housing recess 41 of the turbine housing 27, the annular fitting recess 107 is formed concentrically with the turbine impeller 29. The annular fitting projection 109 is formed on the inner peripheral edge side of the surface of the shroud ring 45 opposite from its facing surface. The annular fitting projection 109 is fitted to the fitting recess 107 of the turbine housing 27. As a consequence, it is easy to achieve alignment between the shaft center of the shroud ring 45 and the shaft center of the turbine impeller 29. In other words, it is easy to achieve alignment between the shaft center of the variable nozzle unit 43 and the shaft center of the turbine impeller 29.

According to the first embodiment of the present invention, while the variable geometry system turbocharger 1 is in operation, each variable nozzle 61 can be brought closer to the facing surface side of the shroud ring 45 without using a seal cover, so that the side clearance between the left side surface of each variable nozzle 61 and the facing surface of the shroud ring 45 can be made as small as possible. As a consequence, it is possible to suppress a leakage flow from a gap between the left side surface of each variable nozzle 61 and the facing surface of the shroud ring 45 while reducing the number of components of the variable geometry system turbocharger 1. In addition, it is possible to stabilize a flow of the exhaust gas along a tip side portion (a portion from a mid-span side to a tip side) of each turbine blade 33 while achieving simplification of the configuration of the variable geometry system turbocharger 1 and an improvement in ease of assembly thereof. In other words, turbine efficiency of the variable geometry system turbocharger 1 can be sufficiently enhanced. Particularly, since it is easy to achieve the alignment between the shaft center of the variable nozzle unit 43 and the shaft center of the turbine impeller 29, the ease of assembly of the constituents of the variable geometry system turbocharger 1 can be improved.

Second Embodiment

A second embodiment of the present invention will be described with reference to FIG. 7 and FIG. 8. Here, as shown in the drawings, "R" means a right-hand direction while "L" means a left-hand direction.

Figure 7:
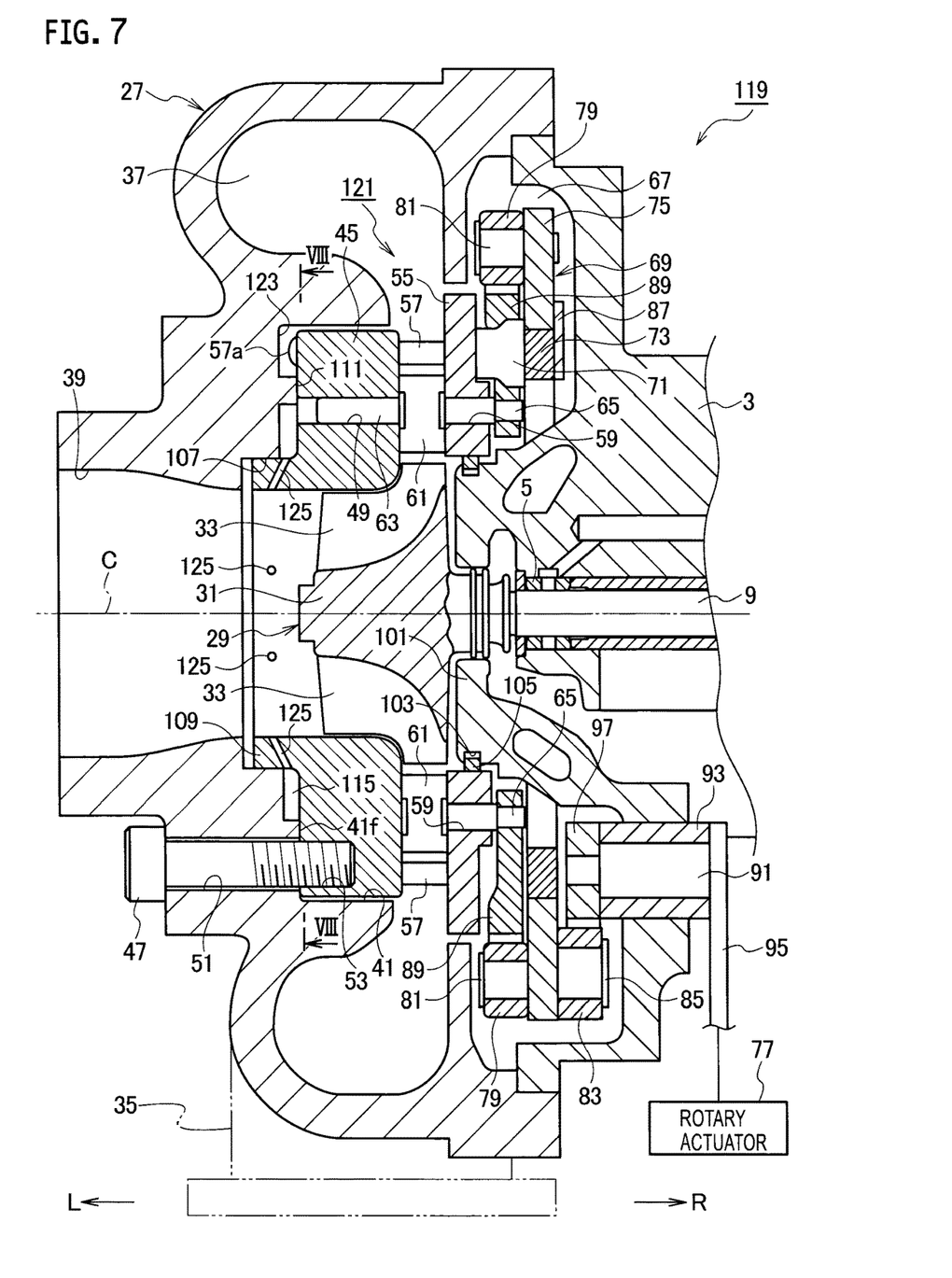
FIG. 7 is a partial front sectional view of a variable geometry system turbocharger according to a second embodiment of the present invention.
Figure 8:
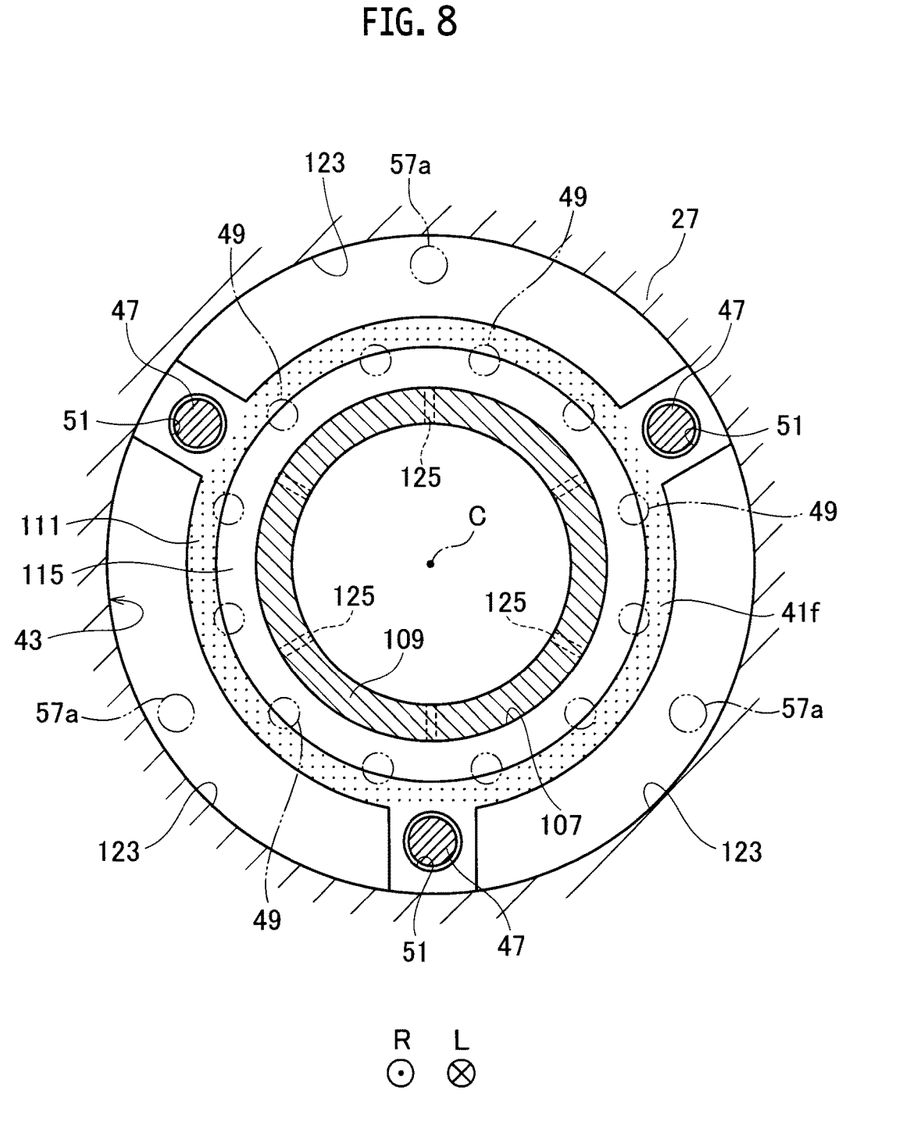
FIG. 8 is a view of the variable geometry system turbocharger taken along the VIII-VIII line in FIG. 7.

As shown in FIG. 7 and FIG. 8, a variable geometry system turbocharger 119 according to the second embodiment of the present invention has a similar configuration to that of the variable geometry system turbocharger 1 (see FIG. 1) according to the first embodiment of the present invention. The variable geometry system turbocharger 119 is equipped with a variable nozzle unit 121 which can alter the passage area for the exhaust gas to be supplied to the gas impeller 29 side. In the following, only the portions of the configuration of the variable geometry system turbocharger 119 which are different from those of the configuration of the variable geometry system turbocharger 1 will be described. Here, among multiple constituents of the variable geometry system turbocharger 119, those corresponding to the constituents of the variable geometry system turbocharger 1 will be denoted by the same reference signs in the drawings.

Multiple dents 123 are formed in a region radially outside the close attachment portion 111 (a dot-hatched region in FIG. 8) of the bottom surface 41f of the housing recess 41 of the turbine housing 27. Each of the multiple dents 123 is formed into an arc shape, and houses the swaged head 57a of the corresponding connection pin 57. Meanwhile, multiple connection holes 125 are formed in the fitting projection 109 of the shroud ring 45 at intervals in its circumferential direction. Each connection hole 125 communicates with the connection path 115 and the outlet side of the turbine impeller 29. In other words, the multiple first support holes 49 in the shroud ring 45 communicate with the outlet side of the turbine impeller 29 through the connection path 115 and the multiple connection holes 125 in the shroud ring 45. Here, instead of forming the multiple connection holes 125 in the fitting projection 109 of the shroud ring 45, multiple different connection holes (not shown) communicating with the connection path 115 and the outlet side of the turbine impeller 29 may be formed at a peripheral edge of the fitting recess 107 of the turbine housing 27 at intervals in its circumferential direction. Alternatively, the connection path 115 and the above-mentioned connection holes (not shown) maybe formed at intervals in the circumferential direction in addition to the multiple connection holes 125.

The second embodiment of the present invention also has the same operation and effect as the first embodiment of the present invention.

Note that the present invention is not limited to the descriptions of the above embodiments, but can be embodied in various other modes. In addition, the scope of right to be covered by the present invention is not limited by these embodiments.

What is claimed is:
1. A variable geometry system turbocharger equipped with a variable nozzle unit being disposed between a turbine scroll passage and a gas discharge port inside a turbine housing in such a way as to surround a turbine impeller, and being configured to alter a passage area for an exhaust gas to be supplied to the turbine impeller side, wherein
the variable nozzle unit comprises:
a shroud ring being provided in a manner united to an inner wall surface of the turbine housing by using an attachment bolt, including a plurality of first support holes formed to penetrate the shroud ring and arranged in its circumferential direction, and covering outer edges of a plurality of turbine blades of the turbine impeller;
a nozzle ring being provided at a position away from the shroud ring in an axial direction of the turbine impeller in a manner united to the shroud ring, and including a plurality of second support holes formed to penetrate the nozzle ring and arranged in its circumferential direction in such a way as to match the plurality of first support holes in the shroud ring; and a plurality of variable nozzles being disposed in the circumferential direction of the rings between a facing surface of the shroud ring and a facing surface of the nozzle ring, each variable nozzle being rotatable in forward and reverse directions about a shaft center which is parallel to a shaft center of the turbine impeller, including a first nozzle shaft formed integrally with a side surface of the variable nozzle on one side of in the axial direction, and rotatably supported by the corresponding first support hole in the shroud ring, and including a second nozzle shaft formed integrally with a side surface of the variable nozzle on another side in the axial direction and coaxially with the first nozzle shaft, and rotatably supported by the corresponding second support hole in the nozzle ring, a surface side of the nozzle ring opposite from its facing surface communicates with the turbine scroll passage, the inner wall surface of the turbine housing includes a close attachment portion in a continuous annular shape to be closely attached to a portion radially outside the first support holes in a surface of the shroud ring opposite from its facing surface by a fastening force of the attachment bolt, and the plurality of first support holes in the shroud ring communicate with an outlet side of the turbine impeller.

2. The variable geometry system turbocharger according to claim 1, wherein an annular fitting recess is formed concentrically with the turbine impeller at a portion of the inner wall surface of the turbine housing, the portion being located on a side close to an inlet of the gas discharge port, an annular fitting projection to be fitted to the fitting recess of the turbine housing is formed on an inner peripheral edge side of the surface of the shroud ring opposite from its facing surface in such a way as to project to the gas discharge port side, and the close attachment portion of the turbine housing is located radially outside the fitting recess.

3. The variable geometry system turbocharger according to claim 2, wherein a connection path, which communicates with the plurality of first support holes in the shroud ring, is defined between a radially inner side of the close attachment portion on the inner wall surface of the turbine housing and the surface of the shroud ring opposite from its facing surface, the variable geometry system turbocharger includes at least any one of a cutout formed in at least any one of the fitting recess of the turbine housing and the fitting projection of the shroud ring, and designed to communicate with the connection path and the outlet side of the turbine impeller, and a connection hole formed in at least any one of the fitting projection of the shroud ring and a peripheral edge of the fitting recess of the turbine housing, and designed to communicate with the connection path and the outlet side of the turbine impeller, and the plurality of first support holes in the shroud ring communicate with the outlet side of the turbine impeller through the connection path and any of the cutout and the connection hole.

4. The variable geometry system turbocharger according to claim 1, further comprising:

a sealing unit configured to suppress leakage of the exhaust gas from the surface side of the nozzle ring opposite from its facing surface to an inlet side of the turbine impeller.

5. The variable geometry system turbocharger according to claim 2, further comprising:

a sealing unit configured to suppress leakage of the exhaust gas from the surface side of the nozzle ring opposite from its facing surface to an inlet side of the turbine impeller.

6. The variable geometry system turbocharger according to claim 3, further comprising:

a sealing unit configured to suppress leakage of the exhaust gas from the surface side of the nozzle ring opposite from its facing surface to an inlet side of the turbine impeller.

\* \* \* \* \*